United States Patent
Smith et al.

(10) Patent No.: US 6,460,582 B1
(45) Date of Patent: Oct. 8, 2002

(54) E-Z FUNNEL FOR VEHICLES

(76) Inventors: Billy W. Smith, P.O. Box 199, Ethridge, TN (US) 38456; Joyce Smith, P.O. Box 199, Ethridge, TN (US) 38456

( * ) Notice: Subject to any disclaimer, the term of this patent is extended or adjusted under 35 U.S.C. 154(b) by 0 days.

(21) Appl. No.: 10/055,117

(22) Filed: Jan. 22, 2002

(51) Int. Cl.[7] .......................... B65B 39/00; B67C 11/04
(52) U.S. Cl. ...................... 141/340; 141/331; 141/339; 141/364; 141/98
(58) Field of Search ................................ 141/331–345, 141/98, 285, 297, 364; D9/434, 435, 436, 447; D7/700; D15/150

(56) References Cited

U.S. PATENT DOCUMENTS

| | | | | |
|---|---|---|---|---|
| 5,074,343 A | * | 12/1991 | Tyree, Jr. ................ | 141/297 |
| 5,472,025 A | * | 12/1995 | Conrad et al. ............ | 141/331 |
| 6,116,299 A | * | 9/2000 | Cummins et al. .......... | 141/332 |
| D432,915 S | * | 10/2000 | Smith ..................... | D9/436 |

* cited by examiner

Primary Examiner—Timothy L. Maust

(57) ABSTRACT

A funnel (1) designed for providing accommodations for the the consumer, especially the disabled. By adapting the funnel at the base with a cut-out wedged end (3) and drilling a hole (4) through the center of gas cap (2) the funnel can now be put together and attached permanently with epoxy glue that is non-soluble. A user of this funnel can now screw it onto the gas spout of their vehicle and with it's special design, the gas goes right into the tank without any back splash. Also their hands are free to hold the container they are using to carry the gas in.

1 Claim, 2 Drawing Sheets

E-Z FUNNEL FOR VEHICLES

BACKGROUND

This invention relates to gas funnels, specifically to such funnels which are used to screw onto the vehicle's spout.

Super markets and auto stores supply customers with plastic funnels. Such funnels are used to fill vehicle gas tanks. Originally these funnels worked well, but now requirements for lead free gas have changed the entrance to the vehicle's spout. Therefore regular funnels don't work conveniently and can cause a back splash. Plus the consumer must hold the funnel with one hand and try to pour the gas into the funnel with the other hand, making it very difficult, especially for the elderly, handicapped, physically impaired and physically challenged by illness, such as crippling arthritis.

With E-Z Funnel you just screw it onto the gas spout on your vehicle and with it's special design the gas goes right into the tank. Your hands are free to hold the container you used to carry the gas in.

SUMMARY

The invention, an improved funnel, has a wedged end and an attached gas cap to make it more convenient for the disabled consumer by providing them with more mobility and worry-free of spills or back-splashes.

DRAWINGS

FIG. 1 shows the two parts, the funnel and gas cap.
FIG. 1A shows the two parts put together.

REFERENCE NUMERALS IN DRAWINGS 1 funnel
2 gas cap
3 cut out wedge
4 funnel location hole

DESCRIPTION

Figure 1:
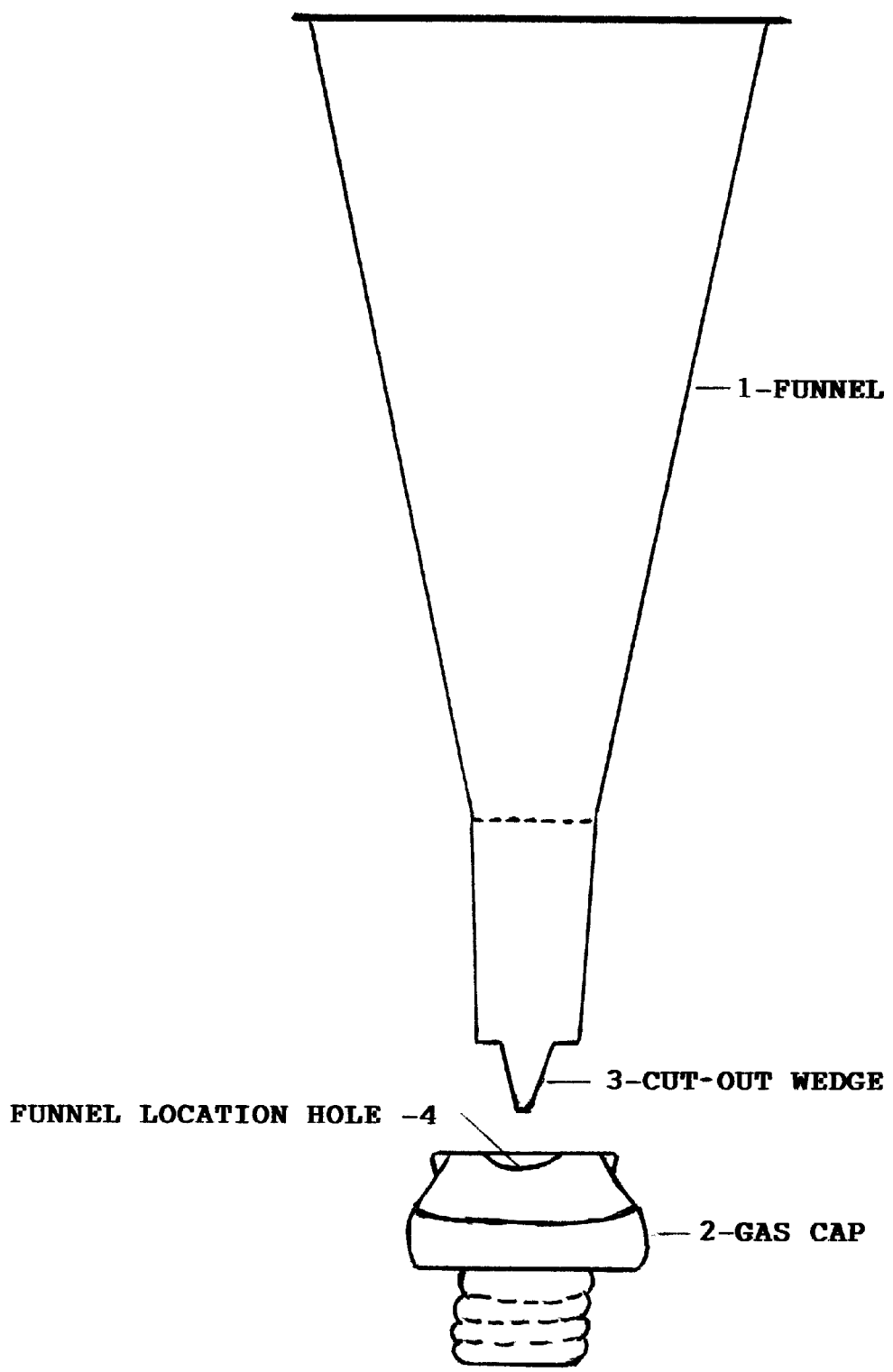
FIG. 1 is viewing the two parts of the invention with the wedge 3, cut out at bottom of funnel. Also shown is the funnel location hole 4, which is drilled through the top of the gas cap to place the bottom of the funnel into.
Figure 1A:
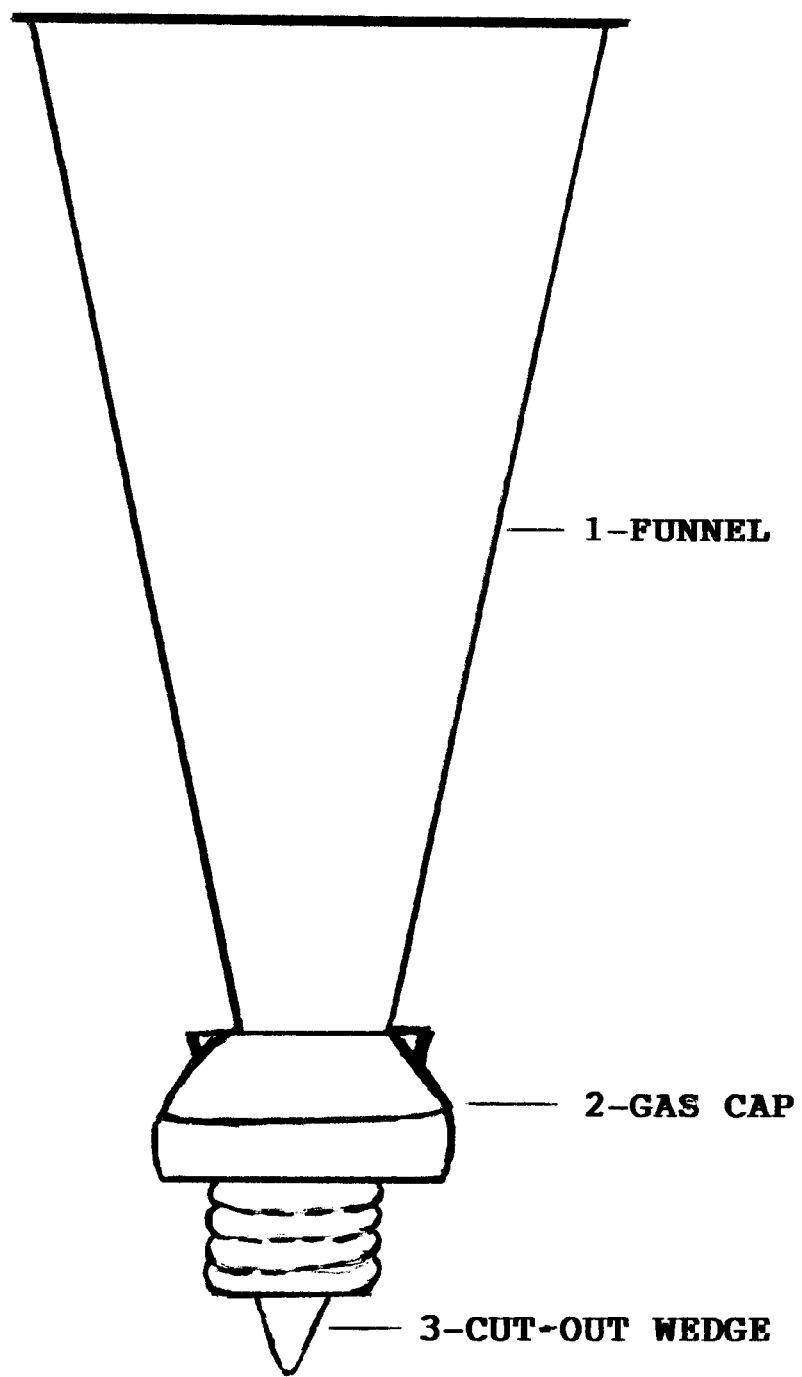
FIG. 1A is viewing the two parts together using an epoxy glue to hold them in place.

What is claimed is:

1. In a funnel, comprising:

A cylinder for transferring gas from a container to a gas tank which an upper portion of said cylinder is a heavy duty plastic circular cone that narrows at the base with a cut-out wedged end;

a lower portion is a durable plastic gas cap with a hole drilled through the center and includes a plastic male threaded unit depending from a base of said gas cap;

wherein said plastic cylinder, applied together with a regular sized non-locking gas cap is designed to provide help for those who become stranded.

* * * * *